(No Model.)
G. W. MANSON.
BOLT.
No. 491,019. Patented Jan. 31, 1893.
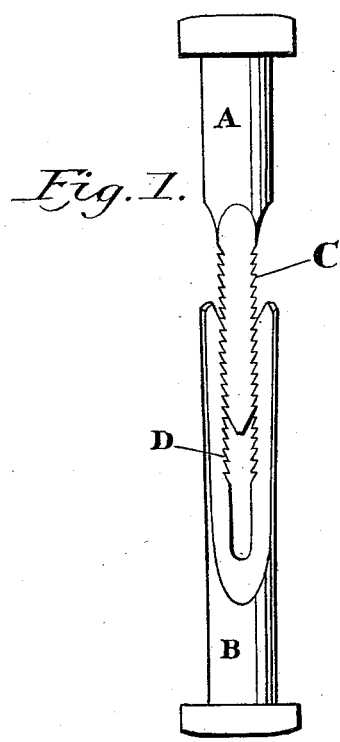
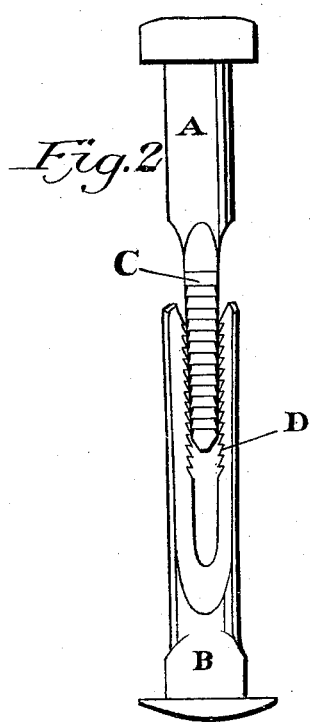
Witnesses.
Inventor.

UNITED STATES PATENT OFFICE.

GEORGE W. MANSON, OF MENOMINEE, MICHIGAN.

BOLT.

SPECIFICATION forming part of Letters Patent No. 491,019, dated January 31, 1893.

Application filed March 26, 1892. Serial No. 426,622. (No model.)

*To all whom it may concern:*

Be it known that I, GEORGE W. MANSON, a citizen of the United States, residing at the city of Menominee, county of Menominee, and State of Michigan, have invented a new and useful Improvement in Bolts, of which the following is a specification.

The following is a detailed description of my invention, reference being had to the accompanying drawings, forming part thereof.

Similar letters refer to similar parts in said drawings.

My invention consists of a bolt in two sections which instantly and automatically adjusts itself as to length, and locks when placed in position.

The objects of my invention are first, to provide a bolt the cost of manufacturing which will be much less than that of the old style screw thread bolt with nut; second, a bolt which will be instantly and automatically self-fastening and self adjusting in length when driven to the place where it is intended to operate; third, a bolt which will present a finish at both ends, thus obviating the necessity of cutting off and smoothing the end of the bolt protruding beyond the nut where a finish is desired, as in the old style; fourth, a bolt which can be instantly removed without the slow and sometimes almost impossible operation of unscrewing a nut as heretofore.

In Figure 1 A shows the section having flattened sides and upwardly directed notches or serrations at C, to clutch the corresponding downwardly directed serrations on the inner sides of the bifurcated section, B. Fig. 2 shows A given a quarter turn throwing its rounded edges against the serrations, D, which will permit of its being easily withdrawn.

I am not aware that any improvement in bolts resembling this has ever been invented, therefore,

What I claim as my invention and desire to secure by Letters Patent is

A self-locking bolt of two sections, A and B, section A being provided with a reduced portion having flattened sides with upwardly directed notches or serrations thereon, and rounded edges; and section B being split or bifurcated to form two yielding prongs having downwardly directed serrations substantially as described.

In testimony whereof I have signed my name to this specification in the presence of two subscribing witnesses.

GEO. W. MANSON.

Witnesses:
L. M. PACKARD,
A. W. BLOW.